Patented Oct. 27, 1931

1,829,381

UNITED STATES PATENT OFFICE

ERNEST WALTER, OF NEWARK, NEW JERSEY

METHOD OF MAKING POROUS CEMENT

No Drawing. Application filed July 31, 1926. Serial No. 126,339.

This invention relates to a process for making porous cement and similar material by adding to any ordinary cement mix volatile material and a very small amount of metallic powder.

This application is an improvement over the process set forth in my application filed April 5, 1924, No. 704,492. In my previous application I describe a process which produces stones, blocks, slabs, and other forms of building elements which are waterproof, fireproof and are light in weight compared with the ordinary non-porous cement.

In my previous application I describe the use of a volatile material whether solid or liquid, which is mixed with the cement and other ingredients such as sand, hydraulic cement, and the necessary amount of water. The material that is placed in this mix and thoroughly distributed through it, is insoluble in water and has a boiling temperature under the boiling point of water at the atmospheric pressure.

The materials which can be used for this purpose are, for instance, carbon tetrachloride, carbon disulphide, gasoline, benzol, hexane, and similar materials. This material is heated thoroughly in the cement mix until it is emulsified and is in finely divided state throghout the whole body. This mass is exposed to a temperature below the boiling point of water but above the boiling temperature of the volatile material. This heating is usually done by live steam and the finely divided volatile material becomes gaseous and fills the whole mix with a large number of gas bubbles which make the body porous and greatly increases its volume. This is done before the cement sets and the result is a hard porous body with a spongy appearance.

The improvement consists in adding to the cement mix while it is still plastic and usually at the same time that the volatile material is added a small quantity of metallic powder such as zinc, iron, or aluminum.

In the absence of this powder the volatile material will be evaporated. It evaporates rather sluggishly and the liquid has to be superheated considerably above the boiling point before it will actually evaporate and produce vapors which in turn expand the cementitious mass.

I believe this sluggishness is due to the absorption of the fine drops of volatile liquid by the solid ingredients which absorption prevents the volatile agent from evaporating at its boiling point.

The addition of the metallic powder gives a much quicker and better action as it combines with the alkali in the hydraulic cement, generating hydrogen gas, which in expanding opens the mass to a small degree. This partial opening of the mix accelerates the evaporation of the volatile liquid and the expanding of the mass occurs at a temperature very near the boiling point of the volatile agent. In this way, I provide an initial expanding and opening up and the establishment of fine bubbles by the metallic powder and an increased and subsequent expanding by the evaporation of the volatile liquid.

I am aware that metallic powders have been added to cement mixtures for the purpose of making the mass porous by the generation of hydrogen gas. But they have been used alone and thus used it requires a quantity of metallic powder as from one-tenth to one-half percent of the weight of the cement.

In this invention where I use the vapor produced by a volatile liquid as the fundamental agent for the increase in volume, I find that I require only one-tenth to one-twentieth of the amount of metallic powder which would be required if the powder is used alone. In other words, I need only one-hundredth to one two-hundredths part of metallic powder to the weight of cement. In this way, I save a considerable amount of metallic powder.

The volatile material which I use is very cheap as only a very small quantity of it is required. Due to the heating of the mass after it is mixed, I obtain a very quick and positive set of the cement.

Instead of hydraulic cement, other cements or materials like gypsum can be used, but in this case it is necessary to add a small amount of alkali in the form of lime, soda, etc. to combine with the metallic powder and form the necessary amount of hydrogen gas for the initial expanding of the mass.

I claim:

1. The process of making artificial stone which comprises mixing a plastic mass of cementitious material containing a small amount of free alkali with water and a small amount of liquid not soluble in water and which is more highly volatile than water, adding a small quantity of about one one-hundredths of the weight of cement, of metallic powder that will produce hydrogen when mixed with water and the alkali in the cement at a temperature of less than 100° C., heating the mass whereby the powder initiates a large number of gas bubbles and continued heating causes a further expansion by the volatile material.

2. The process of making artificial stone which comprises mixing hydraulic cement containing a small amount of free alkali and aggregates with water and with a small amount of liquid insoluble in water and which vaporizes below the boiling point of water and with a small quantity of about one one-hundredths of the weight of cement mix of metallic powder that will produce hydrogen when mixed with water and the alkali in the cement at a temperature of less than 100° C., heating the mixture so formed whereby the metallic powder causes the initial expansion of the mass and the volatile material causes a continued and major expansion thereof.

In testimony whereof I affix my signature.

E. WALTER.